(No Model.) 3 Sheets—Sheet 1.
O. B. PECK.
CENTRIFUGAL SEPARATOR.
No. 560,622. Patented May 19, 1896.
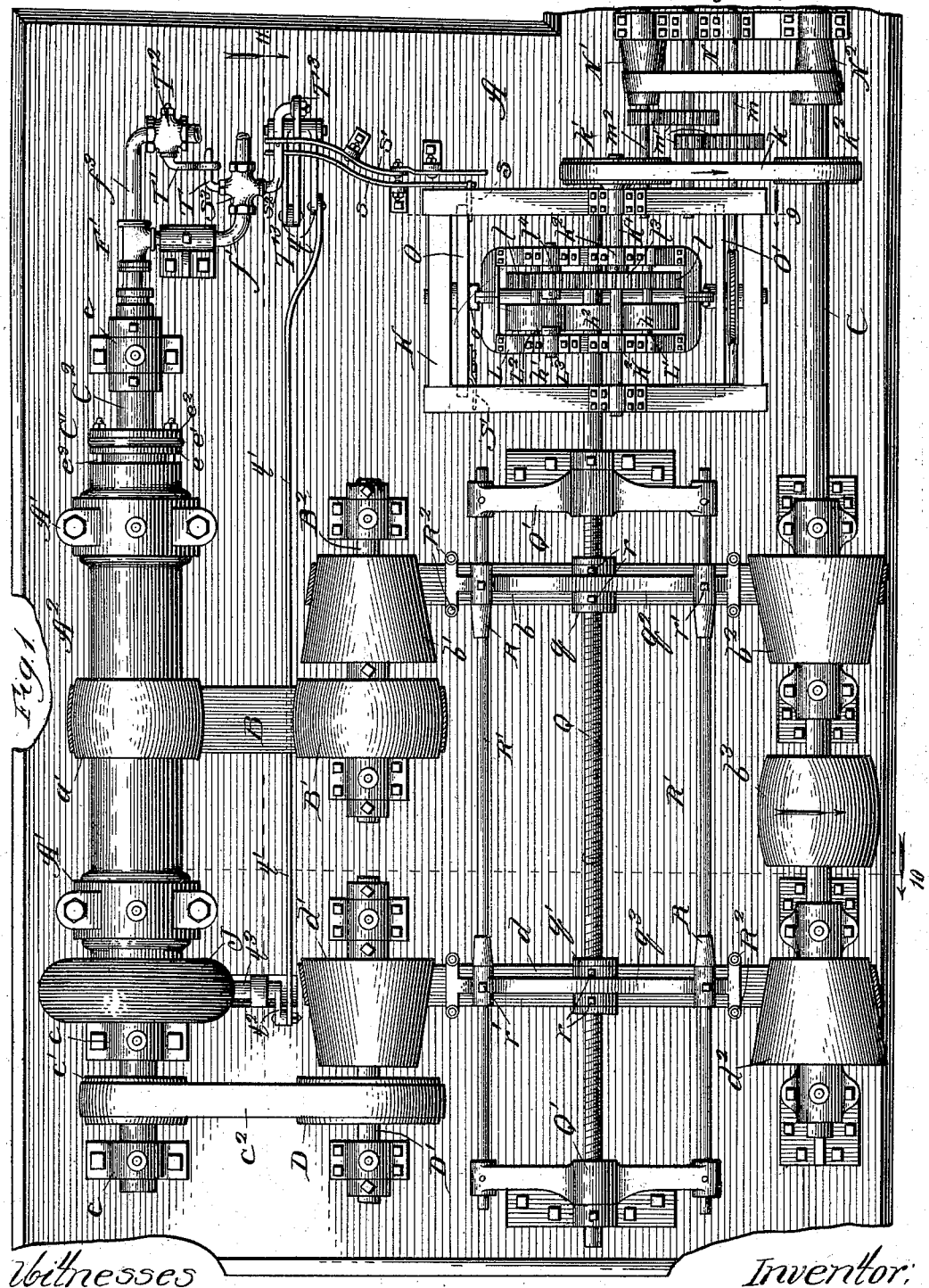
Witnesses
Clifford N. White
R. H. Garman
Inventor:
Orrin B. Peck (No Model.) 3 Sheets—Sheet 2.
O. B. PECK.
CENTRIFUGAL SEPARATOR.
No. 560,622. Patented May 19, 1896.
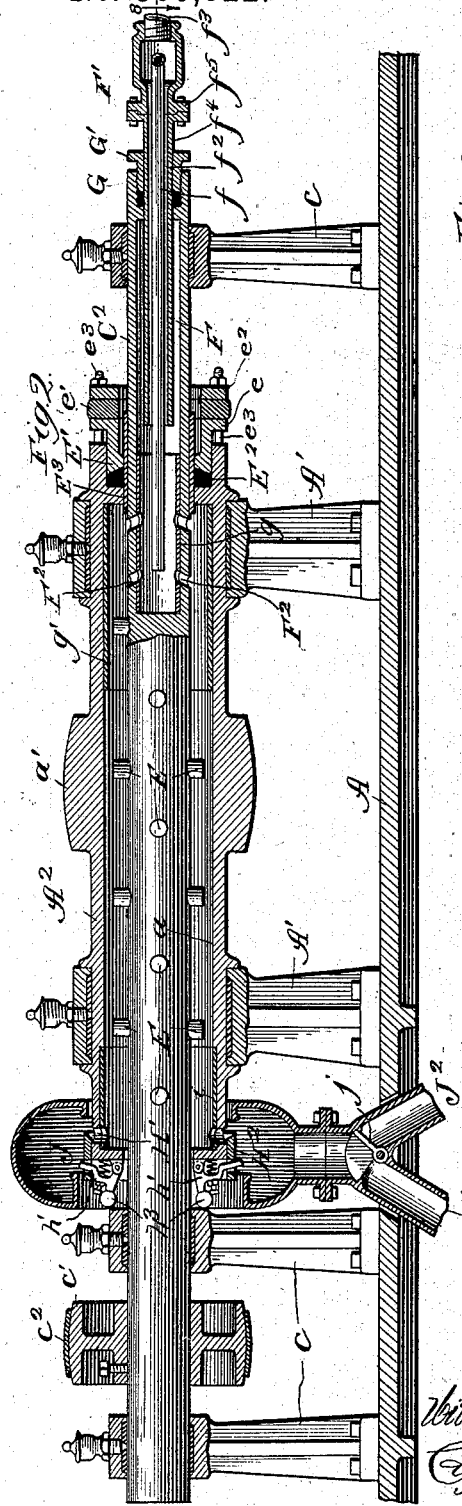
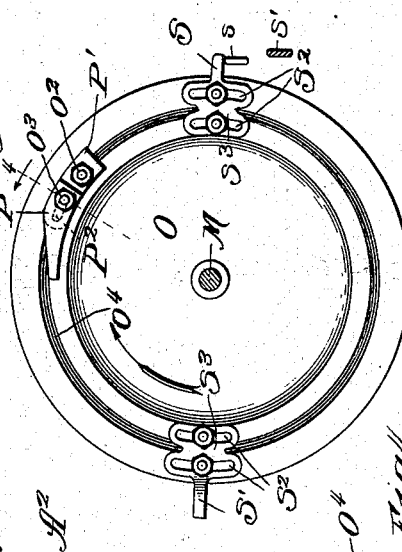
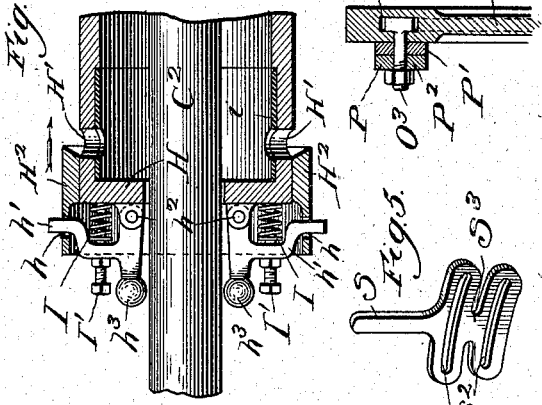
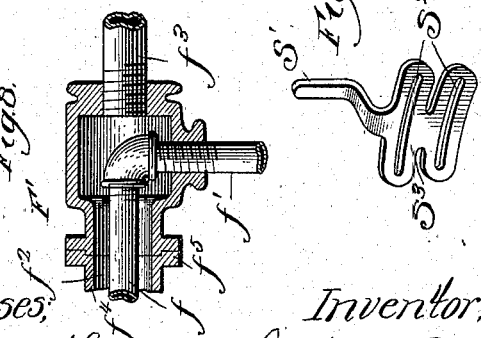
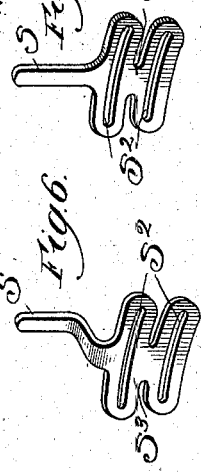
Witnesses:
Clifford N. White,
R. H. Garman
Inventor:
Orrin B. Peck (No Model.) 3 Sheets—Sheet 3.
O. B. PECK.
CENTRIFUGAL SEPARATOR.
No. 560,622. Patented May 19, 1896.
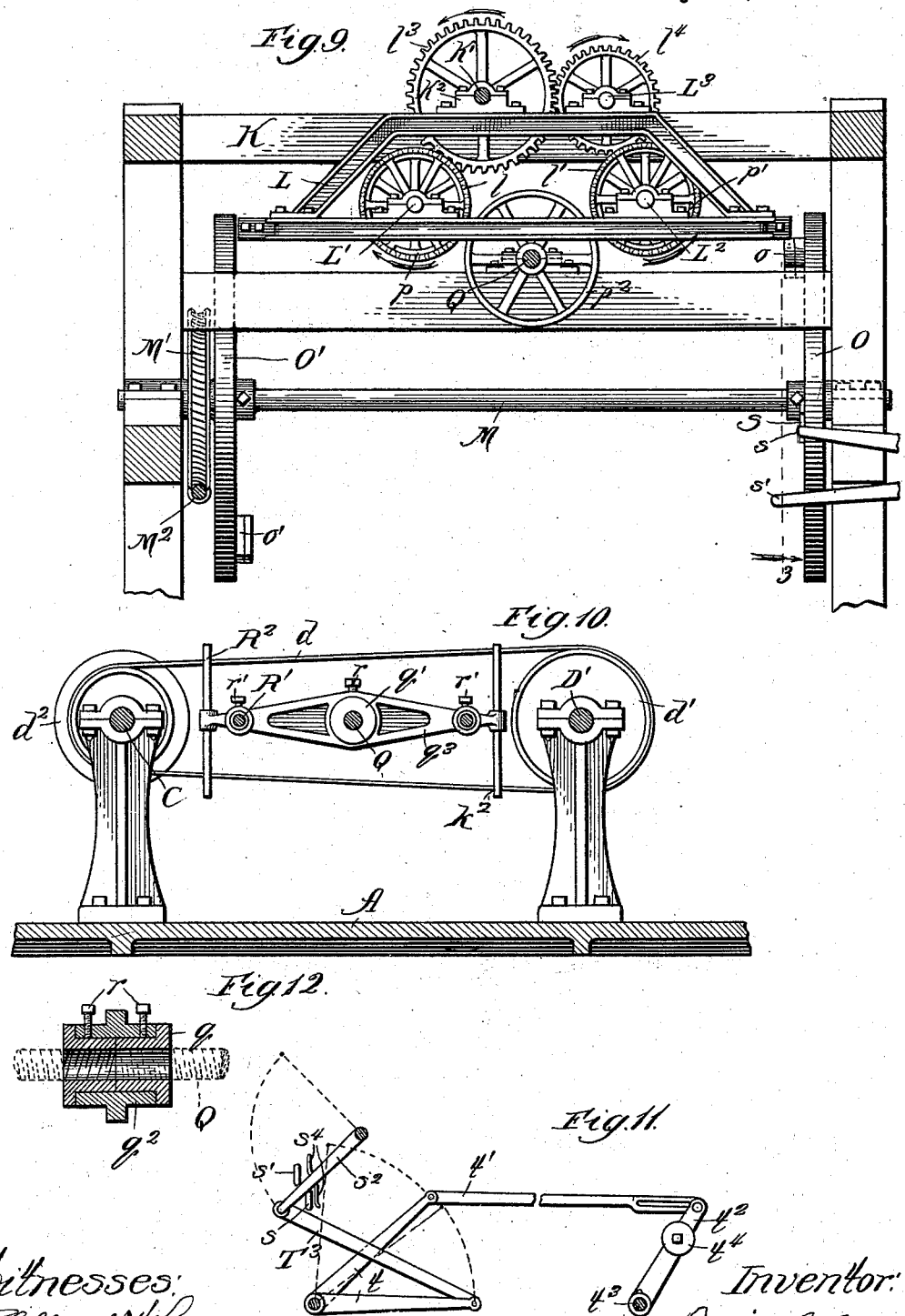

UNITED STATES PATENT OFFICE.

ORRIN B. PECK, OF CHICAGO, ILLINOIS, ASSIGNOR TO MELINDA PECK, OF SAME PLACE.

CENTRIFUGAL SEPARATOR.

SPECIFICATION forming part of Letters Patent No. 560,622, dated May 19, 1896.

Application filed March 28, 1894. Serial No. 505,412. (No model.)

*To all whom it may concern:*

Be it known that I, ORRIN B. PECK, a citizen of the United States, residing at Chicago, in the county of Cook and State of Illinois, have invented a new and useful Improvement in Centrifugal Separators, of which the following is a specification.

My invention relates more particularly to centrifugal ore-separators, and has for its objects various improvements in an apparatus in which materials of different degrees of specific gravity, in a finely-divided state, are subjected to centrifugal and other forces to effect their separation and separate discharge.

I attain these objects by the mechanism illustrated in the accompanying drawings, in which—

Figure 1 is a top plan view of the entire machine. Fig. 2 is a central vertical longitudinal section through the treatment vessel. Fig. 3 is a section on the line 3 of Fig. 9. Fig. 4 is a sectional detail on the line 4 of Fig. 3. Fig. 5 is a perspective view of the contact-fingers S'. Fig. 6 is a similar view of the contact-finger S. Fig. 7 is an enlarged sectional detail showing the mechanism for automatically controlling the area of the discharge-orifices. Fig. 8 is a horizontal sectional detail on the line 8 of Fig. 2. Fig. 9 is a transverse section on the line 9 of Fig. 1. Fig. 10 is a transverse section on the line 10 of Fig. 1. Fig. 11 is a sectional detail on the line 11 of Fig. 1, showing the mechanism for actuating the discharge-valve; and Fig. 12 is a longitudinal sectional detail through the center of one of the belt-shifting bars. All sections are taken in the direction indicated by the arrows.

Similar letters refer to like parts throughout the several views of the drawings.

A designates a base-plate, on which is supported by standards A' A', in which it is journaled, a treatment vessel A², preferably of cylindrical form, and provided with an interior separating-surface $a$. This vessel has upon its exterior a belt surface or pulley $a'$, by which it is rotated by a belt B from a short intermediate counter-shaft B², which is driven by a belt $b$ passing over cone-pulleys $b'$ and $b^2$ on the intermediate counter-shaft and a main counter-shaft C, respectively. The counter-shaft is driven by a pulley $b^3$ from any suitable source of power.

The treatment vessel or separating-cylinder is closed at the feed or head end by a packing or stuffing box C', through which passes an inner shaft or cylinder C², journaled in standards $c\ c$. This inner cylinder is rotated at a different speed from the separating-cylinder, preferably faster, by a pulley $c'$, over which passes a belt $c^2$ from the pulley D on a counter-shaft D', similar to B², it being driven by a belt $d$ passing over its cone-pulley $d'$ and a cone-pulley $d^2$ on the main counter-shaft.

Upon the portion of the cylinder C² which extends over the separating-surface are projections or pins E, which serve, by their impact in their travel through the material and liquid in the separating-cylinder, to agitate it to keep lighter substances in suspension, and later, by their increased impact, to disturb and thus aid in discharging the heavier. The cylinder also serves as a deflector to guide the material along near the separating-surface. The packing-box C', which closes the opening between the inner cylinder and the separating-cylinder, is provided with a gland or sleeve E', which bears against the elastic or yieldable packing E². At the opposite end of the gland is an outwardly-extending annular flange $e$, and upon this rests an annular elastic cushion or spring $e'$, preferably of rubber, the outer surface thereof being protected by a ring $e^2$, against which bear nuts upon a bolt $e^3$, extending through perforations in the ring, cushion, and flange and taking into the end of the separating-cylinder. In operation the expansive force of the spring is constantly exerted to compress the packing to the desired degree, insuring closeness of the connection between the shaft and the cylinder and maintaining a practically water-tight joint. The tension of the spring may be adjusted by varying the position of the nuts on the bolts $e^3$. Upon that portion of the inner cylinder which is within the packing-box is a tightly-fitting wearing-sleeve E³ to protect its surface. This sleeve may be removed and replaced by a new one when worn.

The inner cylinder is cylindrically recessed at F, and into this recess projects a conduit F', through which is fed the material to be treated in a finely-divided state and mingled with a suitable quantity of liquid, preferably water, and also the clear discharging or flushing liquid, preferably water. These pass from this recess through orifices or perforations F² into the channel or passage formed between the inner cylinder and the separating-surface. The conduit F' is compound, having two passages, the inner $f$ being an extension of the material-feeding pipe $f'$, while the outer is formed between this pipe and an enlargement $f^2$ of the liquid-feeding pipe $f^3$, which surrounds it. The passage or pipe $f$ extends nearly to the inner end of the recess at a point adjacent to the orifices F², while the outer passage $f^2$ extends only a part of the distance, stopping at a point intermediate between the extremity of passage $f$ and a packing or stuffing box G, which closes the space between the conduit and the end of the shaft, and the elastic packing of which may be compressed by a threaded gland or sleeve G' to insure a water-tight joint. As a result of this position of the feed-passages the packing-box is protected from the particles of material, which would cause wear and consequent leakage by the flow of the clear liquid from the passage $f^2$, which washes them toward the orifices F² and prevents their passing back of its inner extremity.

The inner section $f^4$ of the outside wall of passage $f^2$ is detachable, being secured to the other portion by bolts passing through the flanges $f^5$. This may be removed and sections of a different length substituted to allow the clear liquid to be delivered at a point where it will be most effective for the pressure of material and liquid used in keeping particles out of packing-box G.

At the inner end of the recess F, about the orifices F², is placed a removable lining $g$ of elastic material, preferably rubber, to receive the impact of material discharged from the feed-pipe, and outside these orifices, upon the separating-surface, is a short section $g'$ of a similar lining to protect it from attrition. Both these linings may be removed when worn and replaced by new ones.

The opposite extremity of the separating-cylinder is closed by a head H, the discharge of material being through a circumferential orifice or a series of orifices H' Upon the exterior of the cylinder, outside these orifices, is a freely-moving sleeve H², provided with perforations $h$, and through these perforations extend levers $h'$, pivoted at $h^2$ and weighted by an enlargement $h^3$. Between the levers and the end of the cylinder are springs or cushions I, against which rest the ends of screws I', passing through the levers and secured against rotation by lock-nuts. When the separating-cylinder is rotated rapidly, the centrifugal force generated causes the weights to move outward, turning the levers $h'$ on their pivots, compressing the springs, and thus moving the sleeve inward over the discharge-orifices, partially closing them. As the speed of rotation is decreased, as hereinafter described, the expansive force of the springs exceeds or overbalances the centrifugal force of the weights and press the levers back, drawing the sleeve with them and increasing the area of the orifices. By setting the screws I' in or out the tension of the springs I may be altered, varying the ratio between the forces.

In the end of the separating-cylinder, about the discharge-orifices, is set a removable section $i$ of flexible lining, which may be replaced when worn by the passage of material over it.

The orifices H' discharge into a hood J, which communicates with branch pipes J' J², conducting lighter and heavier substances, respectively, to suitable receptacles, the passage from the hood to the pipes being controlled by a valve $j$, which is automatically operated, as hereinafter described.

To accomplish the separation of material in the treatment vessel and the separate discharge of lighter and heavier substances, the speed of rotation of the separating-cylinder and inner cylinder, the periods of introduction of material and liquid through passages $f$ and $f^2$, and the operation of the discharge-valve are preferably automatically controlled and periodically or intermittently operated by the mechanism which will now be described. These actions might, however, be otherwise effected, manually, if desired. Upon the base-plate is located a framework K, in the top of which is journaled a shaft K', constantly rotated by a belt $k$, passing from a pulley $k'$ to a pulley $k^2$ on the main counter-shaft. On this shaft K' is hung, by bearings K², a swinging or tilting frame L. In this frame are journaled shafts L' L² L³, the first two rotated by spur-gears $l\ l'$ thereon, the former meshing directly with a gear $l^3$ upon the shaft K', while the latter is driven through an intermediate idle-gear $l^4$ on the shaft L³.

In the lower part of the framework K is journaled a shaft M, upon which is a worm-wheel M', meshing with a worm M² upon a shaft $m$. This shaft is rotated through a train of slow-down gearing $m'$ from a shaft $m^2$, driven by a belt N passing over cone-pulleys N' N², the latter being on the main counter-shaft C. On the shaft M near its opposite extremities are fixed two wheels or disks O O', each having upon its inner surface a contact portion or lug $o\ o'$, normally fixed at points substantially diametrically opposite one another. These lugs are secured to the face of the wheel by bolts O² O³, extending into an annular slot O⁴, cored into the disks near the periphery, the bolts having heads or enlargements which engage the inner side of this slot, and nuts at the outer extremities by which they are fixed in position. By loosening these nuts the lugs may be moved to any point in the slot. These projections or lugs are made in two overlying parts P P', held together by means of the bolt O³, which passes through slots P² therein. By adjusting these parts by one another the length of the contact-surface, which is upon the outer edge, may be varied. As the lugs o o' revolve they engage the ends of the frame L projecting into their path, which slide up an inclined portion of the part P, tilting it in one direction or the other, and alternately bringing friction-wheels p p', carried by the oppositely-rotating shafts L' L², into contact with a friction-wheel p² upon the end of a longitudinally-threaded rod Q, supported in brackets Q' Q' on the base-plate. This rod carries two internally-threaded sleeves q q', upon which are mounted the transversely-extending belt-shifting bars q² q³, which are supported at their outer ends by sleeves R, sliding freely upon rods R', mounted upon the brackets Q' Upon the ends of bars q² q³ are vertical pins R³, engaging the opposite sides of the belts b d, which rotate the separating-cylinder and inner shaft, respectively.

As the friction-wheel p² is alternately rotated in opposite directions by the engagement of the axially-movable friction-wheels p p' the threaded rod is similarly rotated, causing the belt-shifting bars to travel along it and move the belts from one end of the cone-pulleys b' d' to the other, increasing and decreasing the speed of rotation with intermediate periods of constant speed. These pulleys are so arranged on the intermediate counter-shaft that for a decrease in the speed of b' that of d', which is tapered in the opposite direction, is increased for the reason hereinafter stated. The threaded sleeves q q' are preferably made in two parts, as shown in Fig. 12, and upon each of these bears a set-screw r, passing through the belt-shifting bar. If it be desired that either of the belts shall remain stationary in its movement along the surface of the cone-pulleys maintaining the speed of the part rotated thereby constant while that of the other is varied the set-screws are loosened, thus allowing the sleeves to turn freely in the bars and preventing their travel along the threaded rod. At the same time set-screws r' in the supporting-sleeves R are tightened to engage the rods R', thus insuring the belt-shifting bars remaining stationary. In the operation of this machine it is usually preferred that the shifting mechanism for actuating the inner cylinder shall be thrown out of action, as described, a difference in the agitating effect produced by its projections being obtained by the variation in the speed of the separating-cylinder, but the speed may be automatically varied to increase the intensity of the action, if desired.

On the side of the disk O which carries the lug o are two adjustable contact portions or fingers S S', which are secured to the face of the disk by screws passing through slots S² in an enlarged portion S³, the slots permitting an adjustment of the fingers circumferentially of the disk, they being normally at points substantially diametrically opposite and about ninety degrees on each side of the lug o. The finger S lies in the same plane as its enlarged portion and projects close to the face of the disk, while the finger S' is bent twice nearly at right angles, which causes it to project in a plane at a slight distance from the surface. It has also a greater radial length. These fingers respectively engage the ends of levers s s', the former being a simple lever pivoted at the center upon a standard mounted on a base-plate, while the lever s' is compound, its two sections being mounted upon two similar standards. The opposite ends of these levers contact with the lower and upper sides, respectively, of a lever s², extending at right angles from the end of the material-feeding valve s³ in the pipe f'. The opposite extremity of the valve-stem carries a lever T, the end of which projects through a slot in the end of a lever T', fixed to the stem of the liquid-valve T² in the pipe f³.

To the outer extremity of the lever s² is pivoted a rod T³, connected to one member of a bell-crank lever t, pivoted on the base-plate, to the other arm of which is pivotally attached a long connecting-rod t', leading to the upper extremity of a lever t², secured to a rod t³, upon which the discharge-valve j is mounted. Lever t² is attached to the rod t' by a bolt passing through a slot in the latter, and by varying the point of attachment thereto the extent of movement of the valve may be adjusted. A weight t⁴ assists in throwing it one direction or the other.

As the levers s s' are moved downward by the contact of the fingers S S' they respectively raise and lower the lever s², thus opening and closing the valve s³, with intermediate periods during which it is stationary. The lever s² carries upon its upper and lower surfaces small pins s⁴, which serve to prevent the slippage of the levers s s' as they engage it.

The pipes f' f³ are connected to elevated reservoirs, pumps, or other sources of supplies for securing a suitable head of material and liquid to cause a pressure and resultant flow through the cylinder. Manually-operated valves might be arranged between these sources and the separator to govern the pressure irrespective of the position of the automatic valves.

The operation of the device is as follows: The valve s³ being open to its fullest extent and the valve T² partially open material in a finely-divided state and mingled with a liquid, preferably water, is fed into the treatment vessel, which is being rotated at a speed sufficient to develop the desired degree of centrifugal force, in sufficient quantities to fill the channel or passage between the inner cylinder and the separating-surface and under such a head as to create a pressure therethrough. Here the centrifugal force causes the material to move toward a position about the circumference of the vessel and the heavier to lodge upon the separating-surface. The material is also subjected to the agitation produced by the impact of the moving pins or projections which disturbs the materials, permitting the heavier to be precipitated, but causing the lighter to be partially or wholly suspended in the liquid and moved along toward the discharge-orifices with the flow produced by the pressure through the vessel. For the speed at which the separating-cylinder is being rotated the centrifugal force generated in the weights $h^3$ is sufficient to cause the levers to which they are attached to move the sleeve $H^2$ inward, partially closing the discharge-orifices and so checking the flow therefrom as the centrifugal force accelerates it. The separation being accomplished the elements are in a position shown in the drawings, and heavier material is now to be automatically discharged. The inclined portion of the contact-lug $o$ in its revolution engages the right-hand extremity of the frame L, tilting it and moving the rotating friction-wheel $p$ down into engagement with the friction-wheel on the end of the longitudinal threaded rod, rotating it rapidly, thus moving the threaded sleeve $q$ and the bar that it supports, quickly shifting the belt to the opposite end of the cone-pulley. At the same time the finger S strikes the end of the lever $s$, which, by means of the system of levers already described, closes the material-valve, opens wide the clear-liquid valve, and shifts the position of the discharge-valve. As a result of these changes the supply of material is cut off from the treatment vessel, the speed of rotation of said vessel is decreased, causing the heavier substances to be held less firmly against the separating-surface and simultaneously increasing the agitating effect produced by the projections on the inner cylinder, which is constantly rotated through the body of liquid, whose speed of revolution or travel has been decreased, and therefore increasing their relative rate of movement. At the same time the pressure through the vessel is so intensified by the maximum supply of liquid through the pipe $f^3$ that the heavier substances are washed from the separating-surface and out through the discharge-orifices, which are now open to their fullest extent, the expansive effect of the springs I overcoming the centrifugal force of the weights and causing the sleeve $H^2$ to be drawn back by its levers. The valve $j$ has been shifted by its system of levers, so that the heavier substances pass into the pipe $J^2$, which conveys them to a separate receptacle. This position of parts and constant degree of forces for discharge are maintained until the contact-lug $o'$ has revolved sufficiently to engage the opposite end of the frame, tilting it, thus bringing the oppositely-rotating friction-wheel $p'$ into contact with the wheel $p^2$, causing the opposite rotation of the rod $q$, which, with the striking of the fingers S' against the lever $s'$, restores the elements to their former condition, and the period of separation follows.

By means of the adjustment and changes in the various parts of the mechanism, the length and frequency of the periods of operation of the elements, the intensity of the applied forces, and their relations one to the other, may be varied within the desired limits.

By shifting the belt N upon its cone-pulleys the speed of rotation of the disks O O' will be varied, thus altering the frequency with which the contact lugs and fingers operate, and changing, irrespective of the speed of rotation of the counter-shaft, and therefore of the separating and inner cylinders, the rate of change of said speed and the length and frequency of the periods during which material and liquid are introduced into the separator. The latter may be also further varied by the adjustment of the fingers upon the face of the disk O. By changing the position of the contact-lugs about the periphery of the disks, so that they are other than one hundred and eighty degrees apart, the relative length of the periods of separation and discharge will be varied by the alteration in the length of the periods of rapid and slow rotation of the separating-cylinder, and the introduction of material and liquid can be brought into accord with this by the circumferential adjustment of the fingers. The amount which the belts $b$ and $d$ are moved over the surface of the cone-pulleys is controlled by adjusting the length of the contact-face of lugs $o\ o'$.

By setting either of the belt-shifting bars along the threaded rod the timing of the movements of the parts that it actuates will be changed with respect to the other. As has has been stated, the speed of rotation of the inner cylinder is preferably maintained constant; but increased agitating effect may be obtained by throwing its belt-shifting mechanism into operation, the opposite inclination of the cone-pulleys which drive the inner and separating cylinders causing the agitation to be increased to effect the discharge of heavier substances when the centrifugal force is decreased to allow said discharge. If desired, the separating-cylinder might itself be constantly rotated by the fixing of its belt-shifting bar.

Although the terms "cylinder" and "cylindrical" have been applied to the separating vessel and the inner shaft or deflector, this form is not absolutely essential to the operation of the machine, and any other might be employed by which the desired result would be obtained. It is to be understood that the words are used in this generic sense in both description and claims.

It will be seen that when the term "periodically" is applied to the intervals during which separation and the discharge of heavier substances occurs, to the times of supplying material and liquid, and applying the separating force it is not necessarily used in the sense of equal, but of variable or intermittent periods.

It is obvious that many changes and modifications in the details of construction of the various parts of the mechanism herein described may be made as desired by the conductor or to best suit the varied conditions under which the machine is operated without departing from my invention.

In my application, Serial No. 505,410, filed March 28, 1894, I claim certain features shown and described, but not claimed herein.

What I claim as my invention, and desire to secure by Letters Patent, is—

1. In a centrifugal separator, the combination of a rotatable vessel or cylinder, and a feed-conduit extending into the same through a packing-box, and provided with a material-supply passage and a liquid-supply passage, the latter delivering nearest to the packing-box to wash material from the same, and thus prevent the wear thereof which would result from the introduction of the particles, substantially as described.

2. In a centrifugal separator, the combination of a rotatable vessel or cylinder, and a feed-conduit extending into the same through a packing-box, and provided with a material-supply passage and a liquid-supply passage surrounding it, the latter delivering nearest to the packing-box to wash material from the same, and thus prevent the wear thereof which would result from the introduction of the particles, substantially as described.

3. In a centrifugal separator, the combination of a rotatable vessel or cylinder, a shaft or cylinder extending through the same, provided with a hollow portion and passages communicating therefrom to the vessel, a feed-conduit extending into the hollow portion of the shaft through a packing-box, and provided with a material-supply passage and a liquid-supply passage, the latter delivering nearest to the packing-box to wash material from the same and thus prevent the wear thereof which would result from the introduction of the particles, and means for closing the space between one end of the vessel and the shaft, substantially as described.

4. In a centrifugal separator, the combination of a rotatable vessel or cylinder, a shaft or cylinder extending through the same, provided with a hollow portion having a removable lining and communicating with a supply pipe or conduit, passages between said hollow portion and the vessel, and means for closing the space between the receiving end of the vessel and the shaft, substantially as described.

5. In a centrifugal separator, the combination of a rotatable vessel or cylinder, a shaft or cylinder extending through the same, provided with a hollow portion communicating with a supply-conduit, passages between said hollow portion and the vessel, a packing-box for closing the space between one end of the vessel and the shaft, and a removable wearing-sleeve on the shaft within said packing-box, substantially as described.

6. In a centrifugal separator, the combination of a rotatable portion adapted to receive the material for treatment, a conduit communicating therewith in a manner to secure feed of material and liquid under pressure, a packing device for securing the connection between the two, a spring or cushion contacting with the same for maintaining the desired closeness of such connection, and means for varying the compression of the packing by regulating the tension of said spring, substantially as described.

7. In a centrifugal separator, the combination of a vessel or cylinder, means for rotating said vessel at a constant speed to effect the separation of lighter substances and their discharge through an orifice or orifices of constant area, and means for periodically effecting the removal of heavier substances by varying the speed of rotation of said vessel without its stoppage or reversal and the area of the orifices, substantially as described.

8. In a centrifugal separator, the combination of a vessel or cylinder, means for rotating said vessel at a constant speed to effect the separation of lighter substances and their discharge through an orifice or orifices of constant area, and means for periodically effecting the removal of heavier substances by decreasing the speed of rotation of said vessel and increasing the area of the orifices, substantially as described.

9. In a centrifugal separator, the combination of a vessel or cylinder, means for feeding material thereto, means for rotating said vessel at a constant speed to effect the separation of lighter substances and their discharge through an orifice or orifices of constant area, means for periodically stopping said flow of material, and means for periodically effecting the removal of heavier substances by varying the speed of rotation of said vessel without its stoppage or reversal and the area of the orifices, substantially as described.

10. In a centrifugal separator, the combination of a vessel or cylinder, means for supplying liquid thereto, means for rotating said vessel at a constant speed to effect the separation of lighter substances and their discharge through an orifice or orifices of constant area, and means for periodically effecting the removal of heavier substances by varying the speed of rotation of said vessel without its stoppage or reversal, the area of the orifices and the flow of liquid, substantially as described.

11. In a centrifugal separator, the combination of a rotatable vessel, means for varying the speed of rotation of said vessel, and means whereby this change of speed varies the size of the discharge orifice or orifices therefrom, substantially as described.

12. In a centrifugal separator, the combination of a vessel in which material is subjected to centrifugal force, means for varying the intensity of said force, and means whereby the change varies the area of the discharge orifice or orifices from such vessel in an inverse ratio thereto, substantially as described.

13. In a centrifugal separator, the combination of a vessel in which material is subjected to centrifugal force, means for automatically varying the intensity of said force, and automatic means for varying the area of the discharge orifice or orifices from such vessel in an inverse ratio thereto, substantially as described.

14. In a centrifugal separator, the combination of a vessel rotated at varying speeds, a discharge orifice or orifices from said vessel, a cover or covers for said orifices, and a lever or levers actuated by the change in speed to move such covers, substantially as described.

15. In a centrifugal separator, the combination of a rotatable vessel, means for varying the speed of rotation thereof, axially-movable wheels for actuating such means, and a plurality of revolving contact portions for intermittently accomplishing this movement, substantially as described.

16. In a centrifugal separator, the combination of a rotatable vessel, means for varying the speed of rotation thereof, movable wheels mounted in a tilting frame for actuating such means, and revolving contact portions for tilting said frame, substantially as described.

17. In a centrifugal separator, the combination of a rotatable vessel, means for varying the speed of rotation thereon, axially-movable wheels for actuating such means, and a plurality of relatively-adjustable revolving contact portions for accomplishing this movement, substantially as described.

18. In a centrifugal separator, the combination of a rotatable vessel, means for varying the speed of rotation thereof, axially-movable wheels for actuating such means, and revolving contact portions of variable length for accomplishing this movement, substantially as described.

19. In a centrifugal separator, the combination of a rotatable vessel, means for varying the speed of rotation thereof, wheels mounted in a tilting frame for actuating such means, and mechanism for tilting the frame, substantially as described.

20. In a centrifugal separator, the combination of a rotatable treatment vessel, belts passing over cone-pulleys for rotating the same, belt-shifters actuated by a rotatable rod for changing the position of the belts on the pulleys, oppositely-rotating wheels mounted in a tilting frame and contacting with a wheel on such rod to rotate it, and means for effecting their alternate engagement therewith, substantially as described.

ORRIN B. PECK.

Witnesses:
M. L. ALLEN,
R. H. GARMAN.

It is hereby certified that Letters Patent No. 560,622, granted May 19, 1896, upon the application of Orrin B. Peck, of Chicago, Illinois, for an improvement in "Centrifugal Separators," were erroneously issued to Melinda Peck as sole owner of the invention; whereas said Letters Patent should have been issued to *The Patent Title Company, of same place*, said The Patent Title Company being assignee, by mesne assignments, of the entire interest in said invention, as shown by the assignments of record in this Office; and that the said Letters Patent should be read with this correction therein that the same may conform to the record of the case in the Patent Office.

Signed, countersigned, and sealed this 23d day of June, A. D. 1896.

[SEAL.]

JNO. M. REYNOLDS,
*Assistant Secretary of the Interior.*

Countersigned:

S. T. FISHER,
*Acting Commissioner of Patents.*